(12) United States Patent
Kidney

(10) Patent No.: US 8,082,962 B2
(45) Date of Patent: Dec. 27, 2011

(54) SEALING RING FOR A VEHICLE WHEEL

(75) Inventor: Darren Kidney, Wedemark (DE)

(73) Assignee: Continental Aktiengesellschaft, Hannover (DE)

( * ) Notice: Subject to any disclaimer, the term of this patent is extended or adjusted under 35 U.S.C. 154(b) by 246 days.

(21) Appl. No.: 10/590,698

(22) PCT Filed: Jan. 12, 2005

(86) PCT No.: PCT/EP2005/050107
§ 371 (c)(1),
(2), (4) Date: Aug. 25, 2006

(87) PCT Pub. No.: WO2005/082642
PCT Pub. Date: Sep. 9, 2005

(65) Prior Publication Data
US 2007/0175558 A1 Aug. 2, 2007

(30) Foreign Application Priority Data
Feb. 26, 2004 (DE) .......... 10 2004 009 379

(51) Int. Cl.
*B60B 21/10* (2006.01)
*B60C 15/02* (2006.01)
(52) U.S. Cl. .................. 152/379.4; 152/381.5
(58) Field of Classification Search ........... 152/379.3, 152/379.4, 381.4–381.6, 382–383, 399–400, 152/514
See application file for complete search history.

(56) References Cited

U.S. PATENT DOCUMENTS

| | | | | |
|---|---|---|---|---|
| 1,621,021 A * | 3/1927 | Medynski | | 152/400 |
| 1,770,313 A * | 7/1930 | Krone | | 152/158 |
| 3,857,427 A * | 12/1974 | Soucek | | 152/196 |
| 4,289,186 A | 9/1981 | Wilde | | |
| 5,495,881 A | 3/1996 | Girard et al. | | |
| 7,104,300 B2 * | 9/2006 | Veux et al. | | 152/379.4 |

FOREIGN PATENT DOCUMENTS

DE 1021738 12/1957

(Continued)

OTHER PUBLICATIONS

Translation of JP32005354.*

(Continued)

*Primary Examiner* — Jason Bellinger
(74) *Attorney, Agent, or Firm* — Greenblum & Bernstein, P.L.C.

(57) ABSTRACT

A sealing ring for a vehicle wheel having a tubeless tire with two tire beads that are embodied on the radially inward side thereof. The tubeless tire is mounted on the radially outer side of the multipart rim by the tire beads. The vehicle wheel further comprising a sealing ring which seals the tire radially inward towards the ring, is positioned on the radially outer side of the rim, extends in a peripheral direction along the circumference of the rim and runs between the two tire beads in an axial direction. The sealing ring is configured with a central ring member which is provided with a cylindrical inner surface that is to rest on the outer surface of the rim while being embodied with one respective concentric flexible annular leg which is located on both axial sides of the central ring member and extends diagonally and radially outward in an axial direction from the central ring member. Deformable sealing elements extend along the circumference of the annular leg on the radially inward facing surface and are configured on the end of the leg that faces away from the central ring member.

28 Claims, 12 Drawing Sheets

FOREIGN PATENT DOCUMENTS

| | | |
|---|---|---|
| DE | 1053334 | 3/1959 |
| DE | 6 9401237 | 6/1997 |
| DE | 69507779 | 6/1999 |
| FR | 707078 | 7/1931 |
| GB | 787784 | 12/1957 |
| GB | 2044189 | 10/1980 |
| JP | 32-5354 | 7/1957 |
| JP | 8-207507 | 8/1996 |
| LU | 33419 | 4/1955 |

OTHER PUBLICATIONS

International Search Report dated May 3, 2005.
Japanese Office Action mailed Jun. 15, 2010 that issued with respect to patent family member Japanese Patent Application No. 2007-500196, along with a substantive German Translation of relevant portions of the Japanese Office Action and an English language translation of the German translation.

* cited by examiner

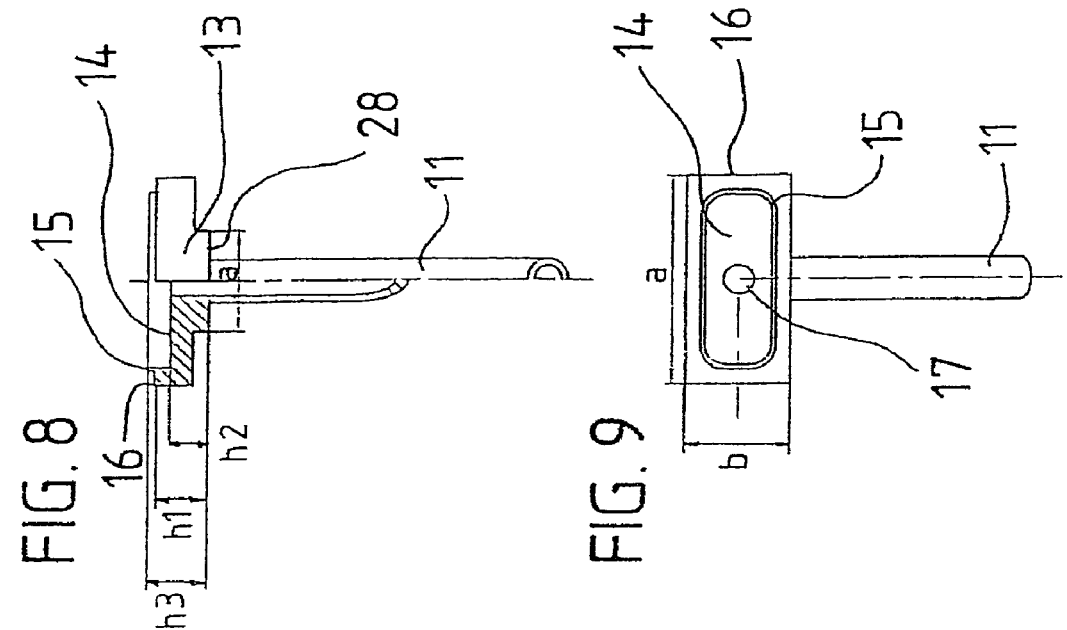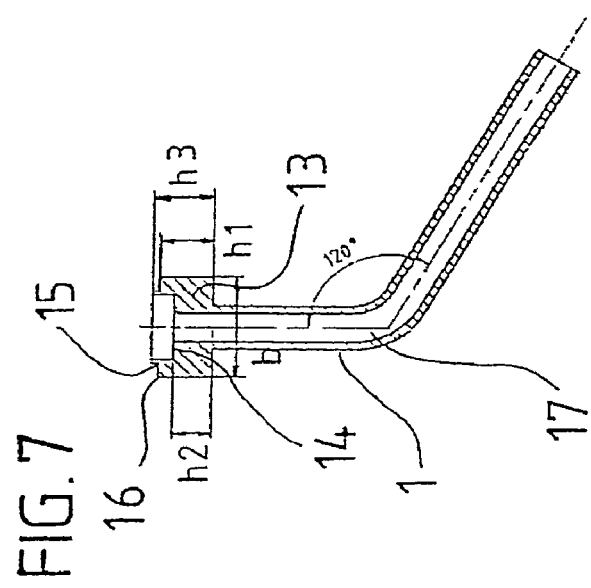

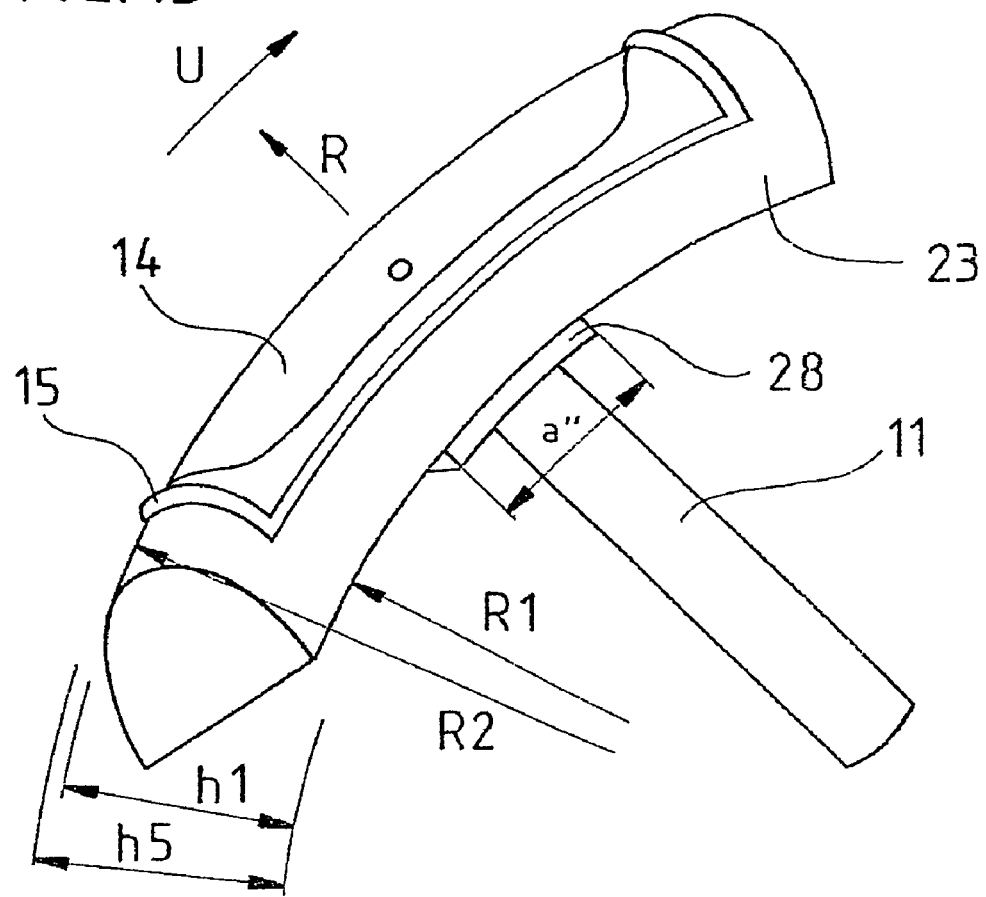

SEALING RING FOR A VEHICLE WHEEL

CROSS-REFERENCE TO RELATED APPLICATIONS

The present application is a U.S. National Stage of International Patent Application No. PCT/EP2005/050107 filed Jan. 12, 2005 which published as WO 2005/082642 on Sep. 9, 2005, and claims priority of German Patent Application No. 10 2004 009 379.2 filed Feb. 26, 2004.

BACKGROUND OF THE INVENTION

1. Field of the Invention

The invention relates to a sealing ring for a vehicle wheel having a tubeless pneumatic tire with two tire beads which are formed on its radially inner side, the tubeless pneumatic tire being mounted on the radial outer side of a multiple part rim by means of its tire beads, and having a sealing ring which seals the pneumatic tire radially inward toward the rim, is arranged on the radial outer side of the rim, extends over the circumference of the rim in the circumferential direction and extends between the two tire beads of the pneumatic tire in the axial direction.

2. Discussion of Background Information

DE-B 1021738 discloses a vehicle wheel having a tubeless pneumatic tire with two tire beads which are formed on its radially inner side, the tubeless pneumatic tire being mounted on the radial outer side of a multiple part rim by means of its tire beads, in which the pneumatic tire is sealed radially inward toward the rim with an insert belt which extends over the circumference of the rim in the circumferential direction and extends between the two tire beads of the pneumatic tire in the axial direction, toward the radial outer side of the rim. To this end, an insert belt which is arched radially outward in axial cross section is inserted during mounting radially outside the rim between the two tire beads, with the result that it presses against the tire beads on account of the excess pressure in the tire in the operating state with its axial end sides while opening the arch and is tensioned in a sealing manner between the tire beads. The contact is largely undefined radially and over the circumference of the tire and depends on the random contact between the insert belt and the individual tire beads during insertion and fastening of the tire beads on the rim. During every loss of compressed air as a result of operation and renewed filling of the vehicle pneumatic tire with compressed air, there is the risk of a random undefined positional change between the insert belt, the rim and the vehicle pneumatic tire. In order to achieve a reliable sealing action and in order to avoid undesirable unbalances, it is necessary to position the insert belt permanently in as defined a manner as possible with respect to the rim and with respect to the vehicle pneumatic tire. Defined permanent mounting of this type is possible only with great additional expenditure, if at all, in the case of this insert belt which is arched radially outward and is merely inserted and clamped between the beads without rim contact.

It is known from DE-B 1053334, in a vehicle wheel having a tubeless pneumatic tire with two tire beads which are formed on its radially inner side, to construct a substantially flat insert belt which is configured on both axial sides with a cross section which tapers to lobes radially outside the tire beads between the tire side walls in the vehicle pneumatic tire during mounting, the tubeless pneumatic tire being mounted by means of its tire beads on the radial outer side of a multiple part rim. When the mounted vehicle pneumatic tire is filled with compressed air, the insert belt is pressed radially inward on account of the internal pressure, with the result that it presses radially between the tire beads with complete axial contact to the tire beads and bears completely against the tire beads and rim and bears with its lobes tightly against the lower tire side walls. In order to achieve complete contact, the flat insert belt is profiled in accordance with the beads, with the result that the bearing contact is achieved completely when it is pressed in radially. The contour of the profiled insert belt with lobes has to correspond to a very accurate negative of the bead and rim contour, and the insert likewise has to correspond very exactly to the setpoint position during mounting, in order that the negative contour of the insert belt can bear accurately against the positive contour of the beads and the rim. This means that both manufacturing expenditure and mounting expenditure become very great in order to ensure a sufficient sealing action.

DE 69401237T2 discloses a vehicle wheel having a tubeless pneumatic tire with two tire beads which are formed on its radially inner side and by means of which the tubeless pneumatic tire is mounted on the radial outer side of a multiple part rim, which is to be sealed radially inward toward the rim with a concentric sealing ring which is mounted between the tire beads. The sealing ring is of substantially cylindrical configuration both on its radial outer side and on its radial inner side, and extends over the entire circumference of the rim in the circumferential direction in the mounted state of the vehicle wheel. The sealing ring is of wider configuration in the axial direction than the spacing between the two tire beads of the mounted vehicle wheel, with the result that it has a sealing axial press fit with respect to the two tire beads in the mounted operating state of the vehicle wheel. In order to achieve a press fit, which is varied from the radial inside to the radial outside along the radial extent of the sealing ring, between the sealing ring and the tire beads, the sealing ring is of profiled configuration at its axial end faces. To this end, the sealing ring is provided with conical runouts on its radial inner side in the axial end face region. The axial pressing force component is transmitted substantially by the axially rigid material block of the sealing ring which extends between the tire beads. The radial pressing force component is applied to a substantial extent by the excess pressure in the vehicle wheel. Even if a positive press fit profile for the sealing action is possible as a result of this, the ability to mount this sealing ring with a substantially cylindrical cross section is made more difficult. For mounting, the sealing ring has to be bent about its circumferential axis counter to the high resistance of the rigid block-shaped cross section, in order that the sealing ring can be inserted at all in the axial direction between the tire beads. The high forces which are required for this and have to be applied from outside endanger the accuracy of the fit.

SUMMARY OF THE INVENTION

The invention makes secure and reliable sealing possible in a simple manner in a vehicle wheel having a tubeless pneumatic tire with two tire beads which are formed on its radially inner side and by which the tubeless pneumatic tire is mounted on the radial outer side of a multiple part rim. A sealing ring which seals the pneumatic tire radially inward toward the rim is arranged on the radial outer side of the rim and extends over the circumference of the rim in the circumferential direction and extends between the two tire beads of the pneumatic tire in the axial direction.

The invention is based on the object of making secure and reliable sealing possible in a simple manner in a vehicle wheel having a tubeless pneumatic tire with two tire beads which are formed on its radially inner side and by means of which the tubeless pneumatic tire is mounted on the radial outer side of a multiple part rim, and having a sealing ring which seals the pneumatic tire radially inward toward the rim, is arranged on the radial outer side of the rim, extends over the circumference of the rim in the circumferential direction and extends between the two tire beads of the pneumatic tire in the axial direction.

According to the invention, a sealing ring for a vehicle wheel has a tubeless pneumatic tire with two tire beads which are formed on its radially inner side by which the tubeless pneumatic tire is mounted on the radial outer side of a multiple part rim. A sealing ring which seals the pneumatic tire radially inward toward the rim is arranged on the radial outer side of the rim and extends over the circumference of the rim in the circumferential direction and extends between the two tire beads of the pneumatic tire in the axial direction. According to the features of an embodiment of the invention, the sealing ring is configured with a central annular body having a cylindrical inner face for seating on the rim outer face and is configured in each case with a concentric flexible annular limb on both axial sides of the central annular body, which limb extends obliquely radially outward in the axial direction from the central annular body to the outside. Deformable sealing elements are formed at an end of the limb which points away from the central annular body. The sealing elements are configured on the radially inwardly pointing surface of the annular limb so as to extend over the circumference of the annular limb.

The flexible annular limbs of this sealing ring make it possible, by simple flexible tilting of the limbs via radially outward to axially inward, to position the sealing ring reliably in its operating position between the tire beads, in which the rigid central annular body is seated reliably on the seat face on the radial outer side of the rim in the operating state of the vehicle wheel, as a result of the excess pressure in the vehicle wheel. The restoring moment of the limbs brings the limbs having deformable sealing elements to bear against the respectively associated tire bead, with utilization of the lever arm, to such an extent that a first sealing action is achieved which is reliably reinforced further over the entire limb with increasing internal pressure in the vehicle wheel as far as operating pressure by deformation of the limb.

The configuration according to the features of an embodiment of the invention is particularly advantageous, in which deformable sealing elements are configured at that end of the limb which points away from the central annular body, which sealing elements are configured radially outside the central annular body on the radially inwardly pointing surface of the annular limb so as to extend over the circumference of the annular limb. As a result, the deformable sealing elements are radially outside the rigid central annular body, as a result of which their bearing faces to the respectively associated tire bead can first of all, for mounting, be tilted away reliably axially inwardly via radially outwardly, and subsequently can be moved reliably into their setpoint position before introduction of the operating pressure by the long lever arm of the limb with utilization of the restoring force of the flexible lever arm. Undesirable damage to the deformable sealing elements on account of high axial pressing forces between the tire bead and the sealing ring during mounting can be avoided as a result. If the internal pressure in the vehicle wheel is increased, the limbs are tilted to the tire bead further and the sealing elements are deformed for increasing the sealing action. In addition, the flexible limbs are bent by a further increase of the internal pressure in the vehicle wheel as far as operating pressure, with the result that the limbs are pressed onto the tire side wall with their axial outer side in a manner which is dependent on the pressure, as a result of which the sealing action is increased further.

The configuration according to the features of an embodiment of the invention is preferred, the sealing elements being sealing lips which are oriented in the circumferential direction, in particular extend over the entire circumference of the sealing ring. As a result, a very reliable sealing action is made possible in a simple manner over the entire circumference of the vehicle wheel. The configuration according to the features of an embodiment of the invention is particularly advantageous, the sealing elements being a plurality of, in particular from three to six, sealing lips which are distributed in the radial direction, oriented in the circumferential direction and, in particular, extend over the entire circumference of the sealing ring. This makes it possible for further sealing lips to come into sealing action during deflection of the limbs on account of the pressure increase in the vehicle wheel, with the result that a pressure-dependent sealing action is achieved.

The configuration according to the features of an embodiment of the invention is particularly advantageous, the sealing lips extending away from the limb substantially perpendicularly with respect to the surface of the limb. This results in particularly advantageous, sealing deformation.

Particularly reliable mounting of the sealing ring which can be positioned in a particularly reliable manner on the rim on account of its high basic rigidity is made possible by the configuration according to the features of an embodiment of the invention. A mechanism for reinforcing the annular body is formed on the central annular body between the annular limbs.

The configuration according to the features of an embodiment of the invention is preferred, because it is very simple to manufacture, in which the mechanism for reinforcement are one or more radial elevations which is/are configured on the radial outer side of the annular body.

The refinement according to the features of an embodiment of the invention is particularly advantageous, a hollow space being formed at least in one radial elevation. As a result, a high basic rigidity of the sealing ring is possible with low weight.

The configuration according to the features of an embodiment of the invention is particularly advantageous, a reinforcing rib which is oriented in the circumferential direction and, in particular, extends over the entire circumference of the annular body being configured on the radial outer side of the central annular body between the annular limbs. This makes reliable stiffening of the sealing ring possible in a simple manner without roundness problems.

An embodiment of the invention contains a further advantageous refinement, the axial spacing between the axial outer sides of the two limbs in a first radial position which corresponds to the radial position of the radially inner ends of the limbs being smaller than the axial bead spacing of the tire beads in the mounted operating state on the rim in this first radial position, the axial spacing between the axial outer sides of the two limbs in a second radial position which corresponds to the radial position of the radially outer ends of the limbs being greater than the axial bead spacing of the tire beads in the mounted operating state on the rim in this second radial position, and the axial spacing between the axial outer sides of the two limbs in the region of the sealing elements being greater than the axial bead spacing of the tire beads in the mounted operating state on the rim in the first radial position. As a result of the axial play between the sealing ring and the tire beads at the radially inner end of the flexible limbs, the sealing ring can be positioned very reliably on the seat face which is formed on the radial outer side of the rim, and can subsequently be sealed via regions of the limbs which lie further outward. This is achieved in a particularly reliable manner by the configuration according to the features of an embodiment of the invention, the axial spacing between the axial outer sides of the two limbs in the region at least of the radially outer, in particular of all, sealing elements which are configured on the limbs being greater than the respective axial bead spacing of the tire beads in the mounted operating state on the rim in this radial position. A sealing action which is dependent on the internal pressure can be achieved in a very simple manner by a configuration according to the features of an embodiment of the invention, the difference of the axial spacing between the axial outer sides of the two limbs minus the axial bead spacing of the tire beads in the mounted operating state on the rim in the respectively assigned radial position decreasing in the radial direction from one sealing element to the next sealing element.

The invention also provides for a sealing ring for a vehicle wheel having a tubeless pneumatic tire with two tire beads formed on a radially inner side and by which the tubeless pneumatic tire is mounted on a radial outer side of a multiple part rim. The sealing ring seals the pneumatic tire radially inward toward the rim and arranged on the radial outer side of the rim, extending over a circumference of the rim in a circumferential direction and extending between the two tire beads of the pneumatic tire in the axial direction. The sealing ring is configured with a central annular body comprising a cylindrical inner face for seating on a rim outer face and configured with a concentric flexible annular limb on both axial sides of the central annular body, each annular limb extending obliquely radially outward in an axial direction from the central annular body. Deformable sealing elements are formed at an end of the annular limb which points away from the central annular body. When the sealing ring is in an un-installed state, the deformable sealing elements are arranged on and project from a radially inwardly pointing surface of each annular limb so as to extend over a circumference of the annular limb.

The deformable sealing elements may be configured radially outside the central annular body and project by a same amount from the radially inwardly pointing surface of the annular limb. The deformable sealing elements may be sealing lips having rounded free ends. The sealing elements may be a plurality of sealing lips distributed in a radial direction and oriented in the circumferential direction. The sealing lips may extend away from the annular limb substantially perpendicularly with respect to a surface of the annular limb. The sealing ring may further comprise a reinforcing member structured to reinforce an annular body formed on the central annular body between the annular limbs. The reinforcement member may be one or more radial elevations configured on the radial outer side of the annular body. The sealing ring may further comprise a hollow space formed at least in one radial elevation. The sealing ring may further comprise a reinforcing rib oriented in the circumferential direction.

An axial spacing between axial outer sides of the annular limbs in a first radial position which corresponds to a radial position of radially inner ends of the annular limbs may be smaller than an axial bead spacing ($t_1$) of the tire beads in a mounted operating state on the rim in the first radial position, an axial spacing between the axial outer sides of the annular limbs in a second radial position which corresponds to a radial position of the radially outer ends of the annular limbs is greater than an axial bead spacing ($t_2$) of the tire beads in the mounted operating state on the rim in the second radial position, and an axial spacing between the axial outer sides of the annular limbs in a region of the sealing elements is greater than an axial bead spacing ($t_1$) of the tire beads in the mounted operating state on the rim in the first radial position. The axial spacing between the axial outer sides of the annular limbs in a region at least of the radially outer sealing elements which are configured on the annular limbs may be greater than a respective axial bead spacing of the tire beads in the mounted operating state on the rim in the radial position. The difference of the axial spacing between the axial outer sides of the two limbs minus the axial bead spacing of the tire beads in the mounted operating state in the respectively assigned radial position may decrease in the radial direction from one sealing element to the next sealing element.

The deformable sealing elements may be sealing lips oriented in the circumferential direction such that in the un-installed state, free ends of the deformable sealing elements define different diameters. The sealing elements may be three to six sealing lips extending over the entire circumference of the sealing ring. The reinforcing rib may extend over the entire circumference of the annular body and configured on the radial outer side of the central annular body between the annular limbs. The axial spacing between the axial outer sides of the annular limbs in the region of all the sealing elements which are configured on the annular limbs may be greater than a respective axial bead spacing of the tire beads in the mounted operating state on the rim in the radial position. The deformable sealing elements may be separated by grooves whose bottoms define different diameters and comprise sealing lips having rounded free ends which define different diameters.

The invention also provides for a sealing ring for a vehicle wheel having a tubeless pneumatic tire with two tire beads formed on its radially inner side and by which the tubeless pneumatic tire is mounted on a radial outer side of a multiple part rim, the sealing ring, in an un-installed state, wherein the ring comprises a central annular body comprising a cylindrical inner face for seating on a rim outer face, a first flexible member arranged on a first side of the central annular body, the first flexible member having an inner surface which extends to the cylindrical inner face and which faces the rim outer surface when the sealing ring is installed on the vehicle wheel, first deformable sealing elements formed on the first flexible member and projecting from the inner surface toward the rim outer surface when the sealing ring is installed on the vehicle wheel, a second flexible member arranged on a second side of the central annular body, the second flexible member having an inner surface which extends to the cylindrical inner face and which faces the rim outer surface when the sealing ring is installed on the vehicle wheel, second deformable sealing elements formed on the second flexible member and projecting from the inner surface toward the rim outer surface when the sealing ring is installed on the vehicle wheel. The free ends of the first deformable sealing elements define different diameters on the first side and free ends of the second deformable sealing elements define different diameters on the second side.

The first and second deformable sealing elements may be separated by grooves whose bottoms define different diameters on each of the first and second sides. The free ends of the first and second deformable sealing elements may be rounded. The bottoms of the grooves may be rounded. The free ends of the first and second deformable sealing elements may be rounded. A circumferential thickness of the first flexible member may be greater at a free end thereof than at a portion of the first flexible member arranged adjacent the central annular body and wherein a circumferential thickness of the second flexible member is greater at a free end thereof than at a portion of the second flexible member arranged adjacent the central annular body. A circumferential thickness of the first flexible member may be greater in a portion of the first flexible member having the first deformable sealing elements than at a portion of the first flexible member arranged adjacent the central annular body and wherein a circumferential thickness of the second flexible member is greater in a portion of the second flexible member having the second deformable sealing elements than at a portion of the second flexible member arranged adjacent the central annular body.

The invention also provides for a sealing ring for a vehicle wheel having a tubeless pneumatic tire with two tire beads formed on its radially inner side and by which the tubeless pneumatic tire is mounted on a radial outer side of a multiple part rim, the sealing ring, in an un-installed state, wherein the ring comprises a central annular body comprising a cylindrical inner face for seating on a rim outer face, a first flexible member arranged on a first side of the central annular body, the first flexible member having an inner surface which extends to the cylindrical inner face and which faces the rim outer surface when the sealing ring is installed on the vehicle wheel, first deformable sealing elements formed on the first flexible member and projecting from the inner surface toward the rim outer surface when the sealing ring is installed on the vehicle wheel, a second flexible member arranged on a second side of the central annular body, the second flexible member having an inner surface which extends to the cylindrical inner face and which faces the rim outer surface when the sealing ring is installed on the vehicle wheel, second deformable sealing elements formed on the second flexible member and projecting from the inner surface toward the rim outer surface when the sealing ring is installed on the vehicle wheel. A circumferential thickness of the first flexible member is greater in a portion of the first flexible member having the first deformable sealing elements than at a portion of the first flexible member arranged adjacent the central annular body. A circumferential thickness of the second flexible member is greater in a portion of the second flexible member having the second deformable sealing elements than at a portion of the second flexible member arranged adjacent the central annular body. Free ends of the first deformable sealing elements define different diameters on the first side and free ends of the second deformable sealing elements define different diameters on the second side. The first and second deformable sealing elements are separated by grooves whose bottoms define different diameters on each of the first and second sides.

DETAILED DESCRIPTION OF THE DRAWINGS

The invention will be explained in greater detail in the following text using the exemplary embodiments of a vehicle wheel with a tubeless industrial tire having a rim which is divided in the axial direction, which exemplary embodiments are shown in FIGS. 1 to 19, in which:

FIG. 7 shows a sectional illustration of the valve body from FIG. 1, without a valve;

FIG. 8 shows an illustration of the valve body in accordance with the view from FIG. 7;

FIG. 9 shows an illustration of the valve body in a top view in accordance with the view IV-IV from FIG. 7;

FIG. 15 shows the valve body from FIGS. 12 to 14, in an alternative embodiment;

DETAILED DESCRIPTION OF THE PRESENT INVENTION

Figure 1:
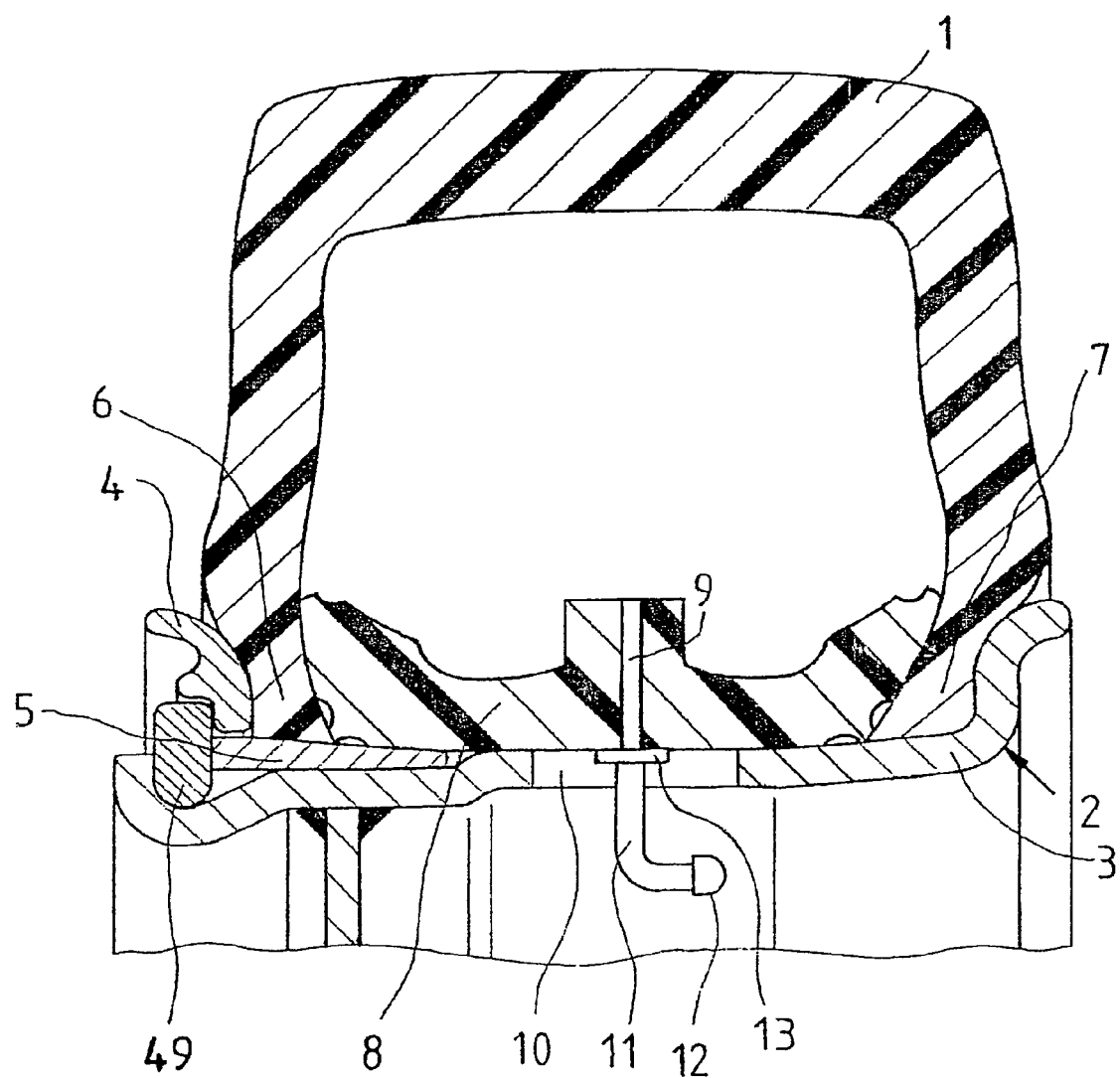
FIG. 1 shows a cross section, which includes the vehicle wheel axis, through a vehicle wheel in the operating state having a tubeless industrial tire and a rim which is configured axially in three pieces, having a sealing ring and having an installed valve body with a valve.

FIG. 1 shows the cross-sectional illustration of a vehicle wheel with an industrial tire, as are used, for example, for forklift trucks, heavy trucks or airfield vehicles, having a tubeless pneumatic tire 1 of a known type which extends in the axial direction, starting from a first tire bead 6, via a side wall on the left in the illustration, a running face region, a side wall on the right in the illustration as far as the second bead region 7. The vehicle pneumatic tire is fastened with its two beads 6 and 7 on a rim 2 of a known type which is divided into four in the axial direction. The rim 2 which is divided into four axially is formed from a basic rim 3 which is configured with a flat bed and the right-hand axial side of which, shown in FIG. 1, is shaped to form a rim horn, from a horn ring 4 which is configured to form the left-hand rim horn in FIG. 1, having an oblique shoulder ring 5 which is split in the circumferential direction and having a closure ring 49 of a known type which is split in the circumferential direction. In the mounted state, the bead 6 of the tire 1 is seated on that radially outer surface of the split oblique shoulder ring 5 which is configured as a seat face, and the bead 7 is seated on that radially outer surface of the rim 3 which is configured as a seat face. Toward the axial outer side, the bead 6 is supported on the horn ring 4 which is configured as a rim horn and the bead 7 is supported on the rim horn of the basic rim 3. A sealing ring 8 which extends over the entire circumference of the rim in the circumferential direction is formed axially between the two beads 6 and 7 and in sealing axial contact with the beads 6 and 7. The sealing ring 8 is of one-piece configuration and consists of sealing rubber material or plastic which is similar to rubber. It is conceivable to embed reinforcing strength carriers of a known type in the rubber material of the sealing ring 8.

Figure 2:
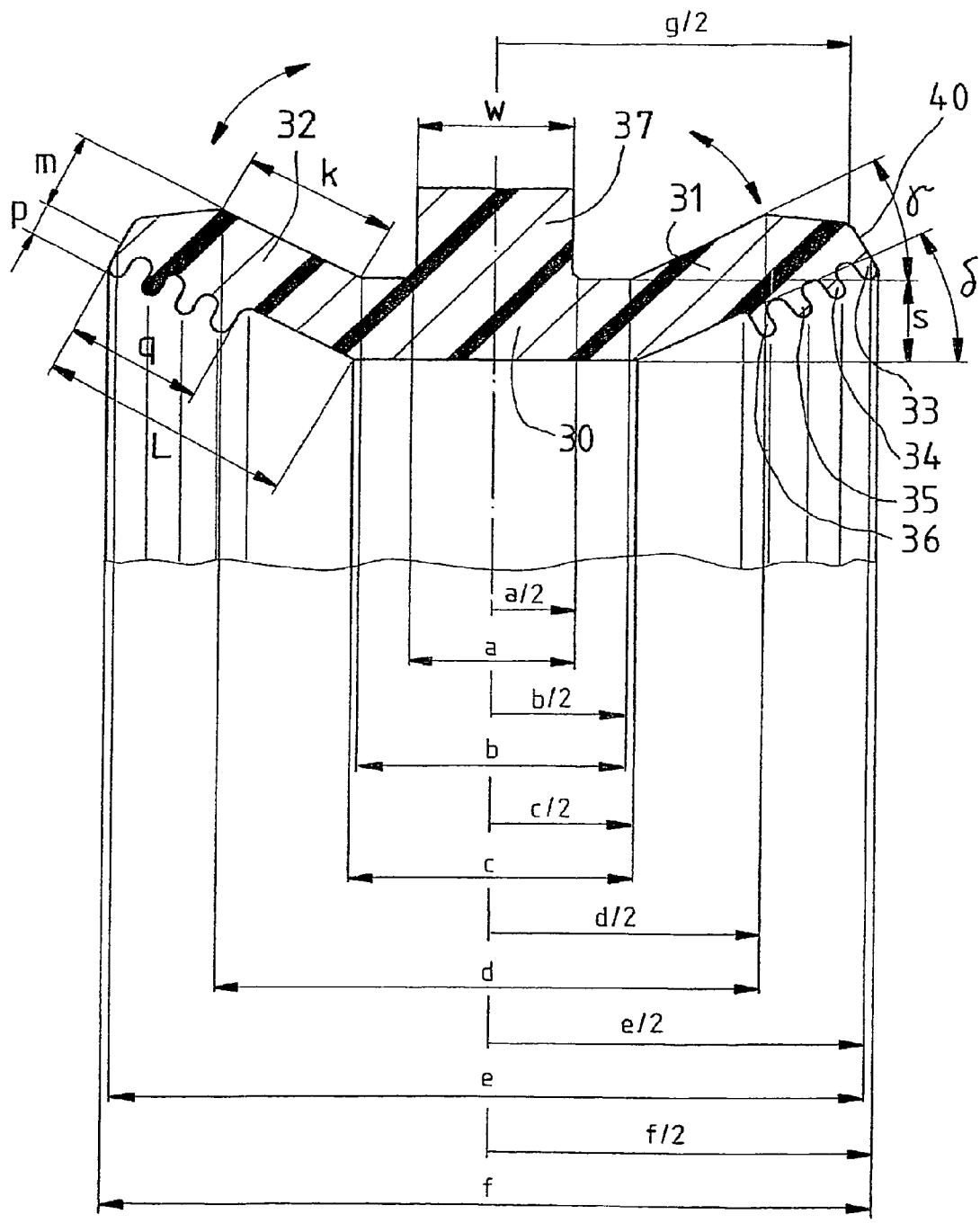
FIG. 2 shows a cross-sectional illustration of the sealing ring from FIG. 1, before installation into the vehicle wheel, in a sectional plane which includes the axis of the sealing ring.
Figure 5:
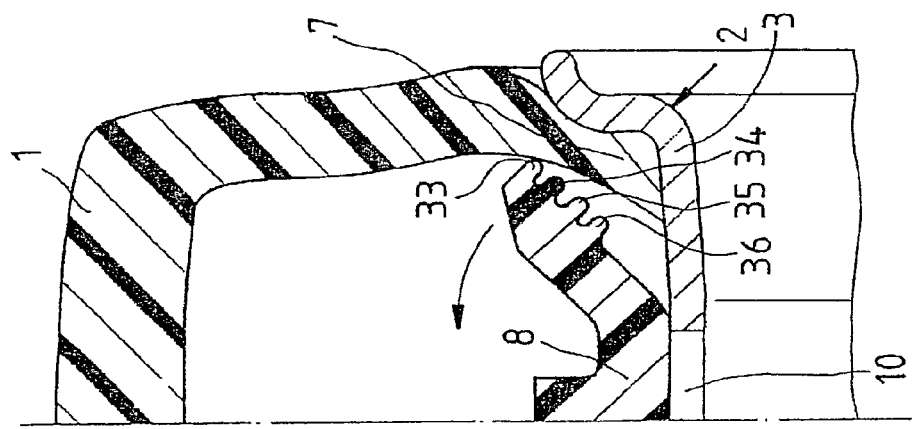
FIG. 5 shows an illustration of the vehicle wheel having a mounted sealing ring, with 0 bar excess pressure in the vehicle tire.

As shown in FIG. 2 which shows the sealing ring 8 in the uninstalled state in the vehicle wheel, the sealing ring 8 is configured with a central annular body 30 with a substantially cylindrical radially inner and radially outer circumferential face, which central annular body 30 extends over an axial width c on its radially inner circumferential face. Axially adjacently to both axial sides of the central annular body 30, the sealing ring is configured in each case with a concentric annular limb 31 or 32 which in each case, starting from the central annular body 30, extends axially outward in the radial direction in a manner which rises toward the outside. The sealing ring 8 having the central annular body 30 and the limbs 31 and 32 is configured symmetrically with respect to the axial center plane. Therefore, only the right-hand side with the limb 31 is shown in FIGS. 3 to 5 and the configuration is described in the following text predominantly with regard to the right-hand limb 31. The radial inner circumferential face of the limb 31 and of the limb 32 extends, starting from the spacing (c/2) from the axial center plane of the sealing ring 8 axially outward at a pitch angle δ as far as the spacing (e/2) from the axial center plane of the sealing ring 8. The radially outer circumferential face of the limb 31 or 32 extends, starting from the spacing b/2 from the axial center plane of the sealing ring 8, enclosing a pitch angle γ with respect to the axial, as far as the spacing d/2 from the axial center plane of the sealing ring 8. Starting from the spacing d/2 from the axial center plane of the sealing ring 8 axially toward the outside, the radially outer circumferential face of the limbs 31 and 32 is configured with a largely axially parallel contour, and therefore almost cylindrically, as far as a spacing g/2 from the axial center plane of the sealing ring 8. This almost cylindrical end runout of the radially outer circumferential face of the limbs 31 and 32 is adjoined in each case by an end face 40, which extends as far as the radially inner circumferential face of the limb 31 or 32 and stands almost perpendicularly on the radially inner circumferential face of the limb 31 or 32. The material thickness m of the limb 31 or 32 which illustrates the respective perpendicular spacing from a radially inner circumferential face to a radially outer circumferential face is selected to be smaller than or as large as the radial thickness s of the almost cylindrical central annular body 30.

The dimensions b, c, d, e, f and g are selected in such a way that b<c<d<g<e<f.

The angles δ and γ are selected in each case between 20° and 35°, the following being true for the amount of the difference: $|(\gamma-\delta)| \geqq 5°$. In the exemplary embodiment shown, the two angles are selected as follows: δ=δ=25°. In this case, the thickness m is configured to be constant over the entire extent k of the radially outer circumferential face between the axial spacing b/2 and d/2 from the axial center plane of the sealing ring.

Sealing lips, four sealing lips 33, 34, 35 and 36 in the exemplary embodiment shown from FIG. 2, are formed on the radially inner circumferential face of the limb 31 or 32, which sealing lips are oriented, in each case starting from the end face 40, over an extent q concentrically with respect to the sealing ring 8 and extend over the entire circumference of the sealing ring 8. The sealing lips 33, 34, 35 and 36 extend in each case perpendicularly oriented with respect to the radially inner circumferential face of the respective limb 31 or 32 over an extent p which is measured perpendicularly with respect to the inner circumferential face, 0.5 mm≦p≦5 mm. The extent q is selected in such a way that q≦(L/2), L being the magnitude of the extent, shown in the sectional plane of FIG. 2, of the radially inner circumferential face of the sealing ring 8 between the axial spacing c/2 and e/2 from the axial center plane of the sealing ring 8.

The maximum axial spacing from the axial center plane of the sealing ring 8 to the axially outermost sealing lip 33 is f/2, where f>e. In the exemplary embodiment shown, the sealing lip 33 forms the extension of the end face 40 with its flank which points axially outward from the sealing ring 8. In this exemplary embodiment, f is also the amount of the maximum axial width of the sealing ring 8.

Figure 3A:
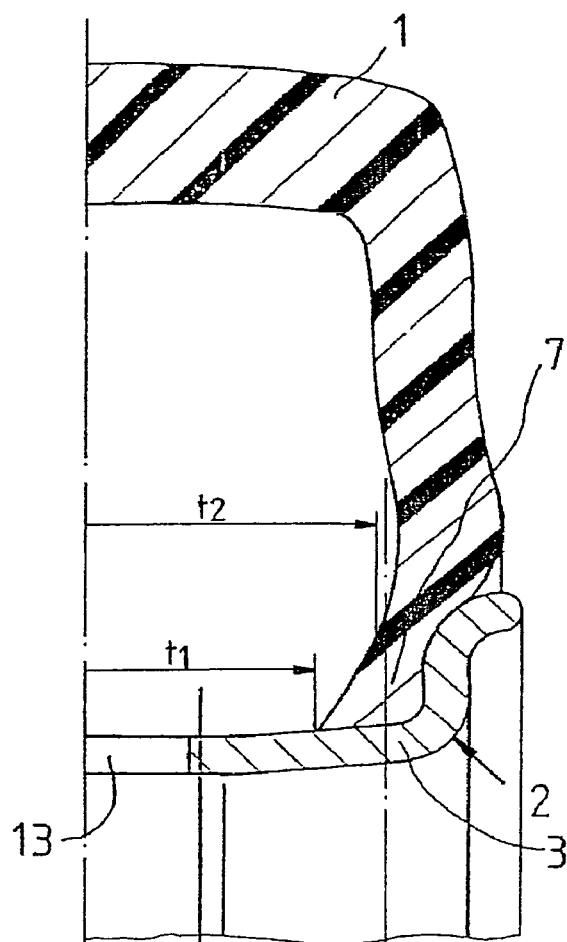
FIGS. 3a and 3b show a sectional illustration of the vehicle wheel in the mounted state, but without a sealing ring, and a sectional illustration of the sealing ring outside the vehicle wheel.
Figure 3B:
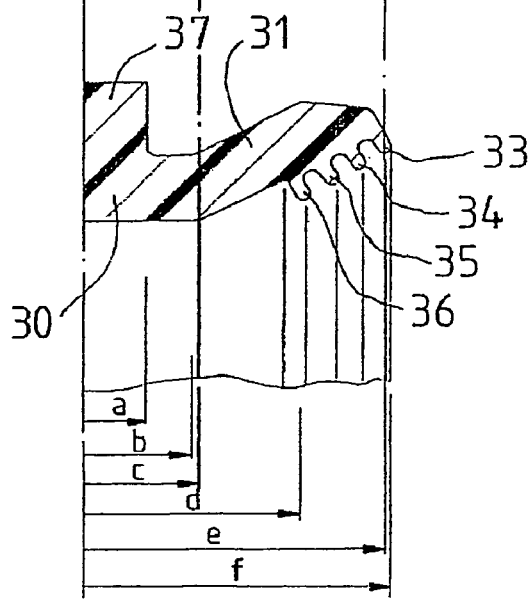
Figure 4:
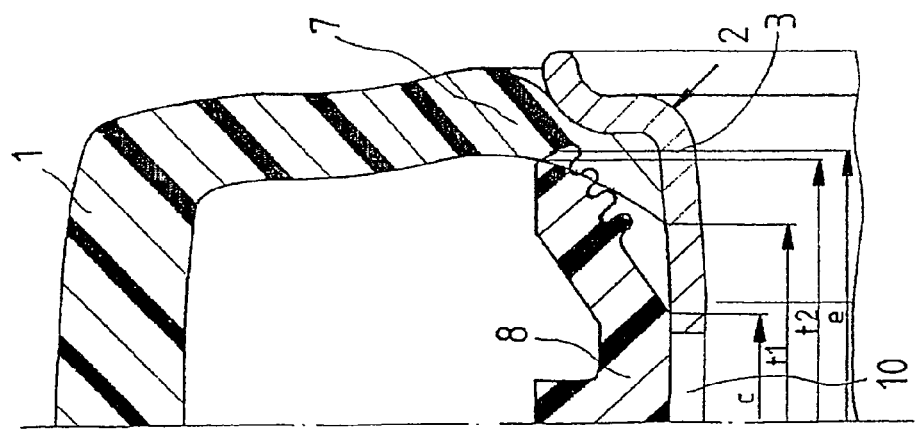
FIG. 4 shows a superimposed illustration of FIGS. 3a and 3b.

As is shown in FIGS. 3a and 3b, the axial extent c of the central annular body 30 of the unmounted sealing ring 8 at its radially inner surface is smaller than the axial spacing $t_1$ which illustrates the axial spacing between the radially inner ends of the two tire beads 6 and 7 of the tire 1 which is mounted on the rim 2. The spacing e which illustrates the axial spacing between the sectional lines of the end faces 40 with respect to the radially inner circumferential faces of the limbs 31 and 32 of the unmounted sealing ring 8 is greater than the axial spacing $t_2$ between the beads in the radial position in the mounted tire 1, which radial position corresponds to the sectional lines of the end faces 40 with respect to the radially inner circumferential faces of the limbs 31 and 32 of the sealing ring 8.

This can also be seen in FIG. 4, in which FIGS. 3a and 3b are shown superimposed for improved illustration.

The difference of the axial spacing between the axial outer sides of the two limbs 31 and 32 minus the axial bead spacing of the tire beads 6 and 7 in the mounted operating state of the tire 1 on the rim 2 in the respective radial position which corresponds to the axial outer sides of the two limbs 31 and 32 decreases in the radial direction from the axially and radially outermost sealing lip 33 to the axially and radially adjacent sealing element 34 on the inside, from the sealing lip 34 to the axially and radially adjacent sealing element 35 on the inside, and from the sealing lip 35 to the axially and radially adjacent sealing element 36 on the inside.

For mounting, the right-hand tire bead in the figures is first of all positioned in a conventional manner in contact with the rim horn on its seat face on the radially outer circumferential face of the rim. In order to mount the sealing ring 8, the latter is then pivoted, and as is shown in FIG. 5 by an arrow, with its right-hand limb 31 counter to the elastic restoring force of the elastically flexible annular limb 31 via radially outward to axially inward and about its connecting point on the central annular body 30, with the result that the sealing ring 8 with its central annular body 30 can be pushed onto the seat face, which is configured to this end, on the radial outer side of the rim 2 between the two tire beads 6 and 7, and can be positioned there. After this, the left-hand tire bead is mounted in a conventional manner in its operating position in axial contact with the side ring 4 which is configured as the left-hand rim horn on the seat face of the oblique shoulder ring 5 of the rim 2 and is fastened by the closure ring 49, by pivoting the left-hand limb 32 counter to the elastic restoring force of the elastically flexible annular limb 32 via radially outward to axially inward and about its connecting point on the central annular body 30. FIG. 5 shows the mounted state of the sealing ring 8 in the vehicle wheel, without excess pressure in the vehicle wheel. As can be seen clearly, the limb 31 and the limb 32 lie in each case, only on account of the elastic restoring force of the pivoted limb 31 and 32, respectively, with its axially outer sealing lip 33 on the associated tire bead 6 and 7, respectively, of the mounted tire 1.

As the internal pressure is increased by filling of the tire 1, which will be shown in greater detail further below, the limb 31 or 32 is pressed via radially outward to axially outward against the tire bead 6 or 7 on account of the increased internal pressure, with the result that first of all the axially outer sealing lip 33 is deformed with an increase in the sealing action, before the adjacent axially inner sealing lip 34 comes into contact with the associated tire bead 6 or 7. If the internal pressure is increased further, this sealing lip 34 is also deformed with an increase in the sealing action, until the adjacent axially inner sealing lip 35 comes into contact with the tire bead 6 or 7. If the internal pressure is increased further, this sealing lip 35 is also deformed with an increase in the sealing action, until the adjacent axially inner sealing lip 36 comes into contact with the associated tire bead 6 or 7.

Figure 6:
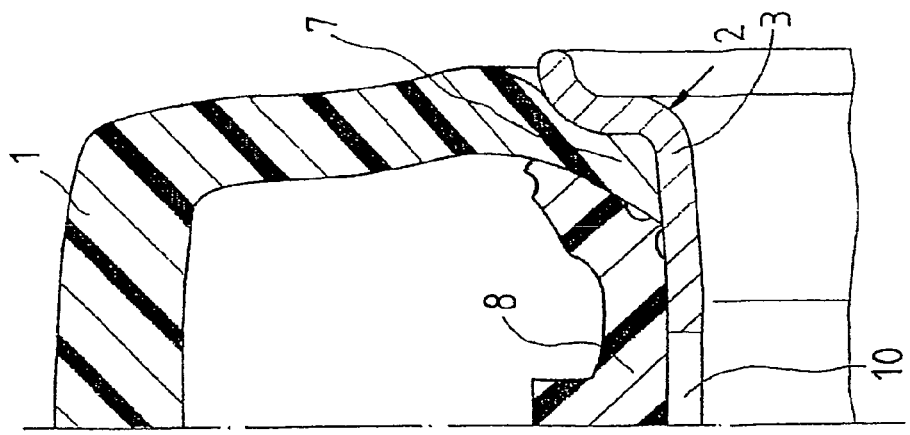
FIG. 6 shows an illustration of the vehicle wheel having a mounted sealing ring in the operating state, with 10 bar excess pressure in the vehicle tire.

If the internal pressure is increased further, this sealing lip 36 is also deformed. If the internal pressure is increased additionally, the limb 31 or 32 is deflected axially outward, with the result that it bears sealingly against the associated tire bead 6 or 7 and the radial outer side of the rim 2. The state with an operating pressure of ten bar excess pressure in the interior of the vehicle wheel is shown in FIG. 6.

In another embodiment, a reinforcing rib 37 which is oriented in the circumferential direction, extends over the entire circumference of the sealing ring and extends over a width w in the axial direction is formed on the radially outer cylindrical circumferential face of the central annular body 30. Here, w is selected in such a way that w≦b. For example, w is selected in such a way that w=(b/2). In the exemplary embodiment shown from FIG. 2, the rib 37 is configured centrally and symmetrically with respect to the axial center plane of the annular body 8.

Figure 12:
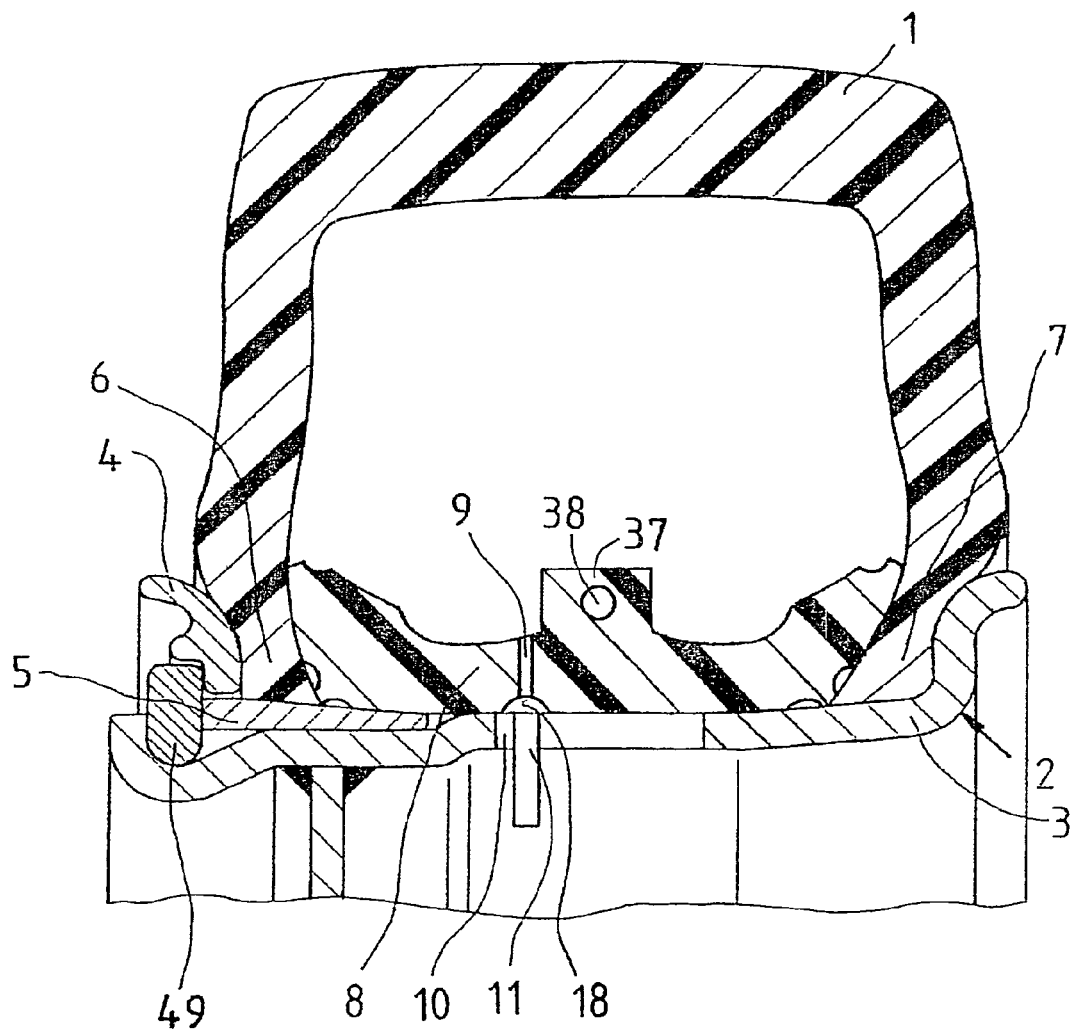
FIG. 12 shows a cross section of a vehicle wheel from FIG. 1, in a cross-sectional illustration which includes the vehicle wheel axis and with an alternative embodiment.

In a further exemplary embodiment (not shown), the rib 37 is configured to be offset axially, with the result that it is no longer arranged symmetrically with respect to the axial center plane of the sealing ring 8. In a further exemplary embodiment which is shown in FIG. 12, an annular hollow space 38 which extends over the entire circumference of the sealing ring is configured in the rib 37.

Figure 19:
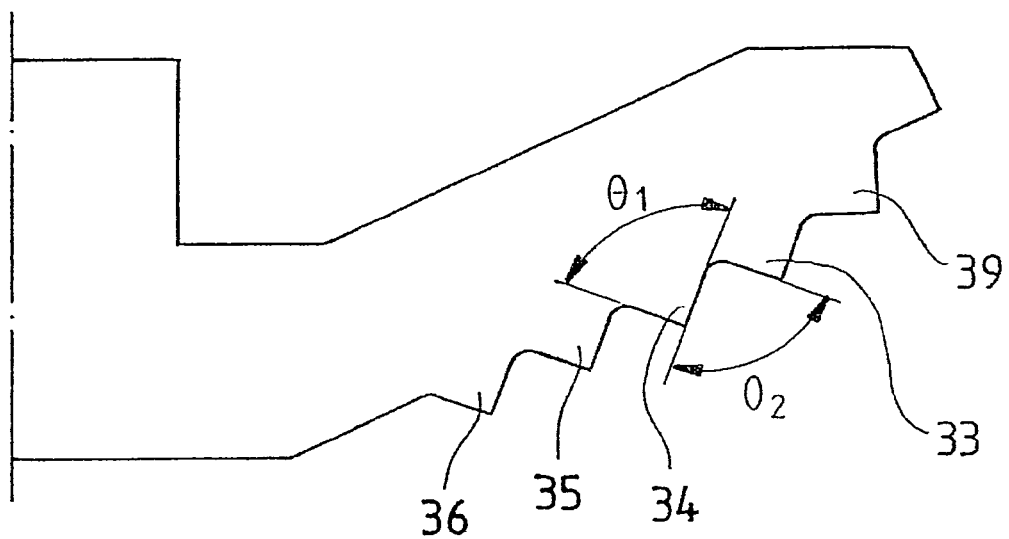
FIG. 19 shows a cross-sectional illustration of the sealing ring from FIG. 1 in an alternative embodiment to the refinement of FIG. 2, before installation into the vehicle wheel, in a sectional plane which includes the axis of the sealing ring.

The sealing lips which are formed on the limbs of the sealing ring 8 are configured with a U-shaped cross section in one embodiment, as shown in FIG. 2 using the four sealing lips 33, 34, 35 and 36. In another embodiment, the sealing lips which are formed on the limbs of the sealing ring are configured with a V-shaped cross section, as can be seen in FIG. 19 using the four sealing lips 33, 34, 35 and 36 which are shown there. In an embodiment which is likewise shown in FIG. 19, those flanks of the respective sealing lip which delimit a sealing lip enclose in each case an angle $\theta_1$, and the flanks which point toward one another of two adjacent sealing lips enclose in each case an angle $\theta_2$.

In one embodiment, $\theta_1+\theta_2=180°$.

In one embodiment, $\theta_1=\theta_2$. In the embodiment which is shown in FIG. 19, $\theta_1=\theta_2=90°$.

FIG. 19 shows a further alternative configuration of a sealing ring 8 from FIG. 2 with five sealing lips 39, 33, 34, 35 and 36.

In an embodiment which is likewise shown in FIG. 19, the sealing lip 39 which is configured furthest to the outside on the limb does not form the extension of the end face 40 with its flank which points axially outward from the sealing ring 8, but the sealing lip 39 is configured spaced apart from the end face 40.

In a further embodiment which is shown in FIG. 19, the outer sealing lip 39 extends in a manner which is oriented perpendicularly with respect to the radially inner circumferential face of the respective limb 31 or 32 over an extent p which is perpendicular with respect to the inner circumferential face and is shorter than the inner sealing lips 33, 34, 35 and 36.

In the mounted operating state which is shown in FIG. 1, the sealing ring 8 rests radially inward on the radially outer surface of the basic rim 3. A cylindrical through opening 9 is formed in the sealing ring 8, which cylindrical through opening 9 is configured so as to extend in the radial direction and has, for example, a diameter of from 1 to 10 mm. The through opening 9 is configured, for example, with a diameter of 1, of 3 or of 6 mm.

Figure 11:
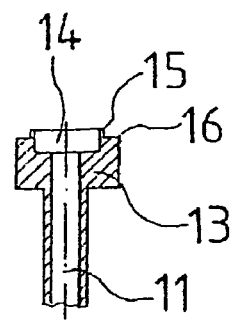
FIG. 11 shows the valve body from FIG. 5, in the sectional illustration VI-VI from FIG. 10.
Figure 16:
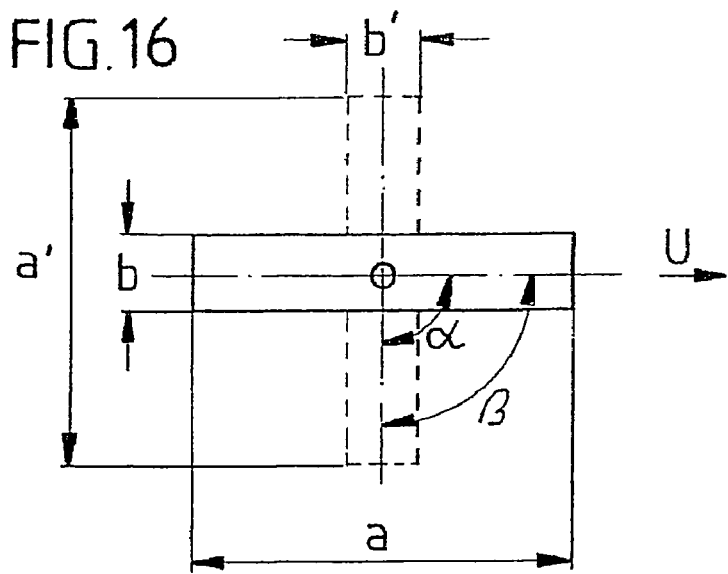
FIG. 16 shows a view of the valve body and rim according to the illustration of the section XI-XI from FIG. 1, in order to explain the fastening of the valve body.

As is shown in FIG. 16, a slot-shaped through opening 10 which extends through the rim in the radial direction is formed in the basic rim 3. The slot-shaped through opening 10 is configured with its longer main extent a' in the axial direction A of the vehicle wheel and with its shorter main extent b' in the circumferential direction U of the vehicle wheel. As is shown in FIGS. 1 and 11, a valve tube 11 extends through the slot-shaped through opening, which valve tube 11 is curved radially outward and outside the vehicle wheel radially inside the rim in the operating state which is shown in FIG. 1 and is fitted with a valve 12 of a known type at its end. A sealing plate 13 which is oriented perpendicularly with respect to the axis of the valve tube is fastened to the valve tube 11 at the other end, for example by brazing, welding or adhesive bonding.

As is shown in FIGS. 1, 7, 8, 9 and 16 using the example of a sealing plate having a base area with a longer main extent a and a shorter main extent b, the plate is configured with a flat surface which forms the plate base 14 on its side which points away from the valve tube 11 and points outward in the vehicle wheel in the radial direction of the vehicle wheel. In the region of the plate base 14, the thickness of the plate is $h_2$ as viewed in the radial direction. The plate is configured with an elevated edge 16 in the radial direction along its border. The thickness of the plate is $h_1$ in the region of the elevated edge 16. A sealing lip 15 which extends in the radial direction is formed on that inner side of the edge 16 which points toward the plate base 14. In the region of the sealing lip 15, the thickness of the plate 13 with the sealing lip 15 is $h_3$. For the dimensions $h_1$, $h_2$ and $h_3$, $h_3>h_1>h_2$.

The main extent direction with the extent a of the sealing plate is at an angle β with respect to the main extent with the extent length b. The first main extent direction with the extent b' of the slot is at an angle β with respect to the second main extent with the extent length a' of the slot. Here, for β, $10°≦β≦90°$. In the exemplary embodiments which are shown in the figures, in which the plate has a rectangular base area, β=90°.

For the extent lengths of the main extents a, b, a', b' of the sealing plate 13 and the slot-shaped through opening 10, a>b, a'>b', a'>a>b'>b.

The through opening of the air channel 17 of the valve tube 11 extends as far as into the plate base 14 of the sealing plate 13. The sealing lip 15 extends along the edge 16 which forms the border of the sealing plate 13, in a manner which circulates around the base 14 with air channel 17.

In the vehicle wheel which is shown in FIG. 1, in the operating state at an operating pressure in the interior of the air chamber which is enclosed in an airtight manner by the tire 1 and the sealing ring 8 of 10 bar, the sealing plate 13, as can be seen in FIG. 16, is oriented with its longer main extent a at an angle α with respect to the longer main extent a' of the slot 10. Here, for example, $60°≦α≦120°$. In the embodiments which are shown in the figures, α=90°.

As a result, the plate 13 rests with its underside on the rim surface outside the slot-shaped through opening 10, and the sealing lip 15 is in sealing contact along its extent with the radial inner side of the sealing ring 8. The sealing opening 9 of the sealing ring 8 opens on the radially inner side of the sealing ring 8 in the region which is surrounded by the sealing lip 15. On account of the high internal pressure of the vehicle tire, the sealing ring 8, sealing plate 13 and basic rim 3 are pressed radially against one another to such an extent that a reliable sealing connection is brought about between the sealing lip 15 and the sealing ring 8.

In order to mount the vehicle wheel, first of all the vehicle tire 1 and the sealing ring 8 are positioned onto the basic rim 3 in a conventional manner, as shown above, and fixed in its operating position. After this, the valve tube 11 which is fitted with the valve 12 is inserted with its plate 13 which is fastened at the end through the slot-shaped through opening 10 between the basic rim 3 and the sealing ring 8, the longer extent a being oriented parallel to the longer extent a' of the slot-shaped through opening 10, until the sealing lip 15 is in contact with the sealing ring 8. After this, the valve tube 11 with the sealing plate 13 is rotated by the angle β about the axis of the valve tube 11 in the region of the slot-shaped through opening 10, with the result that interlacing of the sealing plate 13 and slot-shaped through opening 10 and therefore positional security of the valve tube 11 in the vehicle wheel are ensured. After this, the vehicle wheel is brought to operating pressure with compressed air via the valve 12 and the valve tube 11, the space which is delimited by the sealing lip 15 between the sealing ring 8 and the valve tube 11 and through the through opening 9. As the pressure rises, the sealing ring 8 is pressed at its axial ends with a sealing action against the bead 6, 7 of the pneumatic tire 1 and at its radially inwardly pointing side against the sealing lip 11 of the plate 13. In this way, the vehicle wheel with the tubeless pneumatic tire 1, the sealing ring 8 and the rim of multiple parts in the axial direction is sealed off completely to the outside.

For dismantling, it is sufficient to ventilate the pneumatic tire 1 via the valve 12 of the valve tube 11 to such an extent that the valve tube 11 can be rotated back by the angle α about its axis in the slot-shaped through opening 10, and to remove the valve tube 11 with the sealing plate 13 out of the slot-shaped through opening 10.

Figure 10:
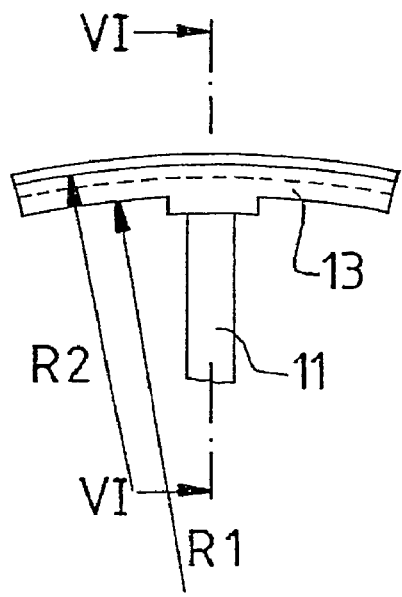
FIG. 10 shows an alternative embodiment of the valve body from FIG. 7.

FIGS. 10 and 11 show a further refinement of the sealing plate 13 which is fastened to the valve tube 11. Here, the sealing plate 13 is curved with a curvature radius $R_1$ about the vehicle wheel axis in a manner which corresponds to the contour of the rim, in its operating position in the operating state of the vehicle wheel, $R_1$ corresponding to the outer radius of the rim in this position. The edges 16 along the longer extent of the sealing plate and extent regions of the sealing lip 15 which are assigned to these extent regions of the edges 16 are of curved configuration in accordance with this curvature, the curvature radius of the edges $R_2$ corresponding to the inner radius of the sealing ring 8 in this position.

FIG. 12 shows a vehicle wheel with an alternative configuration of a sealing plate 23 and the sealing ring 8. The circumferential groove 18 is formed on the radially inner side of the sealing ring 8, which circumferential groove 18 extends over the entire circumference of the sealing ring 8 in the circumferential direction of the sealing ring 8. In the exemplary embodiment, the circumferential groove 18 has a U-shaped cross-sectional contour. The through opening 9 of the sealing ring 8 opens with its radially inner end in the groove bottom of the groove 18. In accordance with the groove contour, the sealing plate 23 with its edge 16 is configured on its longitudinal sides which are oriented in the main extent direction with the longer main extent a with the same thickness $H_1$ and on its end side which is configured with the shorter extent length b with a thickness profile $H_4$ which is varied along its end-side extent, the contour which is configured outward in the radial direction of the vehicle wheel in the installed operating state being configured in a corresponding manner to the U-shaped contour of the cross section of the groove 18. The sealing lip of the endless configuration along the edge 16 is configured in accordance with the edge profile of the edge 16 so as to follow this contour.

For mounting, the valve tube 11 with its sealing plate 23 in front is inserted through the slot-shaped through opening 10 of the basic rim 3 between the basic rim 3 and the sealing ring 8 with orientation of the longer main extent a parallel to the longer main extent a' of the slot-shaped through opening 10, and is rotated there by the angle α, with the result that the sealing plate 23 is oriented with its longer longitudinal extent a in the operating position and in the process engages with a form-fitting connection into the circumferential groove 18. The sealing ring 8 is pressed in a sealing manner with its axial edges against the tire bead 6 and 7 and radially inward in the circumferential groove 18 against the sealing lip 15 of the sealing plate 23 by production of the excess pressure in the vehicle wheel via the valve 12, the valve tube 11, the space which is surrounded by the sealing lip 15 between the sealing ring 8 and the plate base 14 of the sealing plate 13 and via the through opening 9 of the sealing ring 8.

Figure 13:
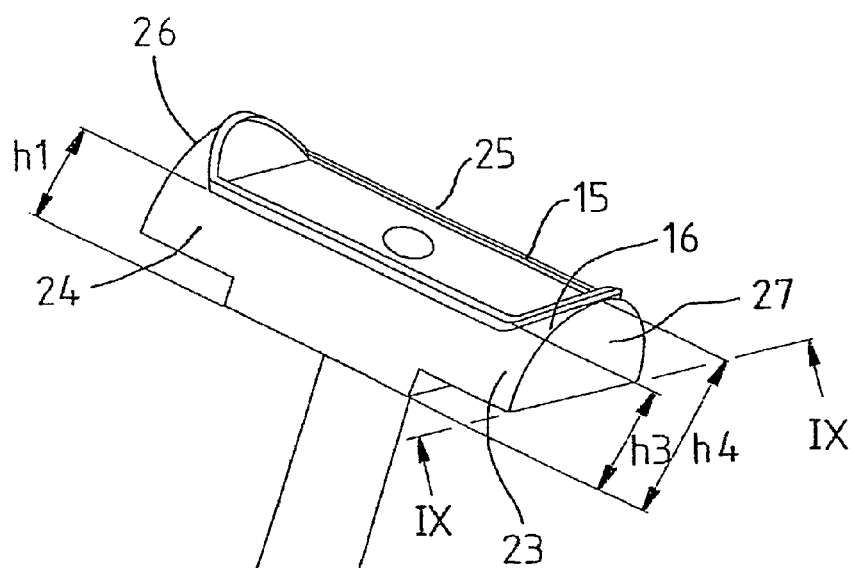
FIG. 13 shows a perspective illustration of the valve body from FIG. 12.
Figure 14:
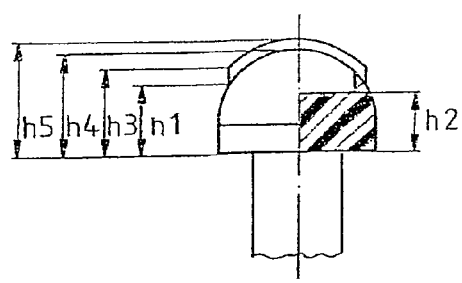
FIG. 14 shows an illustration of the valve body according to the view IX-IX from FIG. 13.

In an analogous manner to the illustration of FIGS. 10 and 11, FIG. 15 shows an alternative embodiment of the sealing plate 23 of FIGS. 12 to 14, in which the sealing plate 23 is of curved configuration around the vehicle wheel axis, according to its operating position in the vehicle wheel, with an inner radius $R_1$ which corresponds to the outer radius of the rim in the operating position of the sealing plate 23, and with an outer radius $R_2$ which corresponds to the inner radius of the sealing ring 8 in the bottom of the circumferential groove 18.

In a further embodiment which is shown in FIGS. 8, 14 and 15, the sealing plate 13 or 23 is configured on its radially inner side to form an interlacing region 28, in the radial extent of which the plate extends in the extent direction of the longer extent a of the plate merely over a dimension a", a" being smaller than the shorter extent a' of the slot-shaped through opening 10. This achieves a situation where, after insertion of the plate 13 or 23 through the slot-shaped through opening 10 between the rim and the sealing ring after rotation of the valve tube 11 with the sealing plate 13 about the angle α, the plate engages radially inward in a form-fitting manner with its interlacing region 28 into the slot-shaped through opening 10.

The sealing plate 13 or 23 with the sealing lip 15 of the above-mentioned exemplary embodiments is manufactured in one piece from rubber, brass or sealing plastic material. In one particular embodiment, the sealing plate 13 or 23 is configured in one piece with the valve tube 11.

Figure 17:
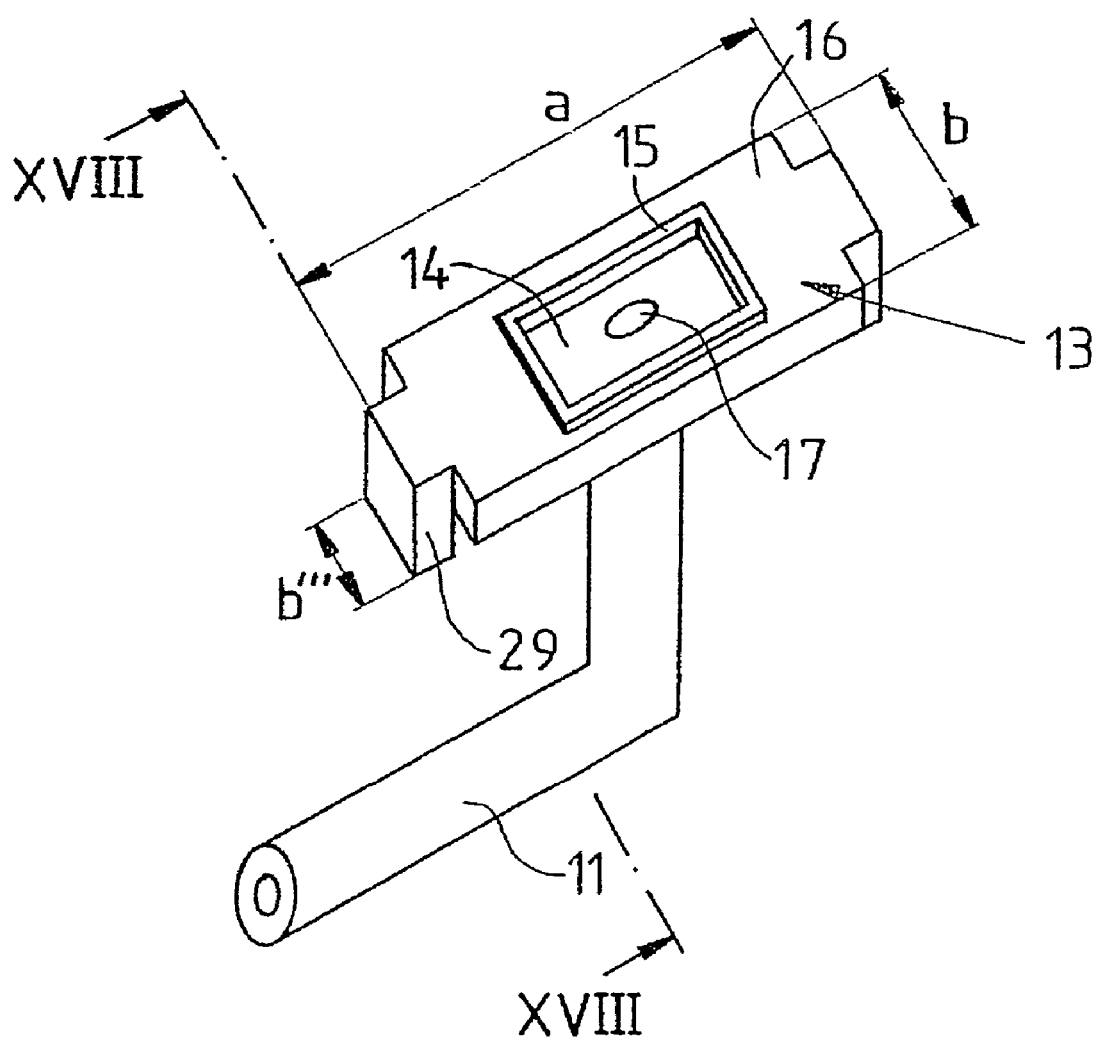
FIG. 17 shows the valve body in an alternative embodiment.

FIGS. 17 and 18 show an alternative embodiment for mounting and fastening a valve tube 11 with a sealing plate 13, using the example of a sealing plate 13 from FIGS. 1, 7, 8 and 9. In this exemplary embodiment, the sealing plate 13 is of rectangular configuration, just like the slot-shaped through opening 10, having the main extents a and b of the sealing plate 13 and the main extents a' and b' of the slot-shaped through opening 10, the sealing plate 13, at both ends of the longitudinal extent, being configured transversely with respect to its longer extent direction a on the surface which points away from the sealing lip 15 in each case with a tongue 29 which extends in the transverse direction with respect to the longitudinal extent over a length b' and from the underside of the sealing plate 13 over a height $h_6$; b''' being <b'<b<a<a'.

Figure 18A:
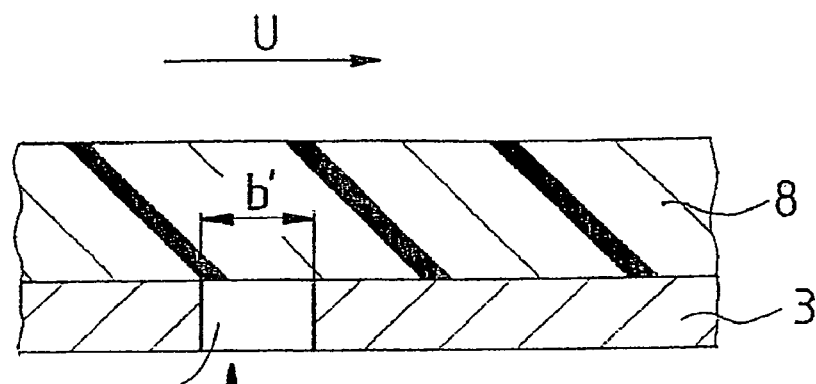
FIGS. 18a and 18b show an explanation of the mounting of the valve body from FIG. 17.
Figure 18B:
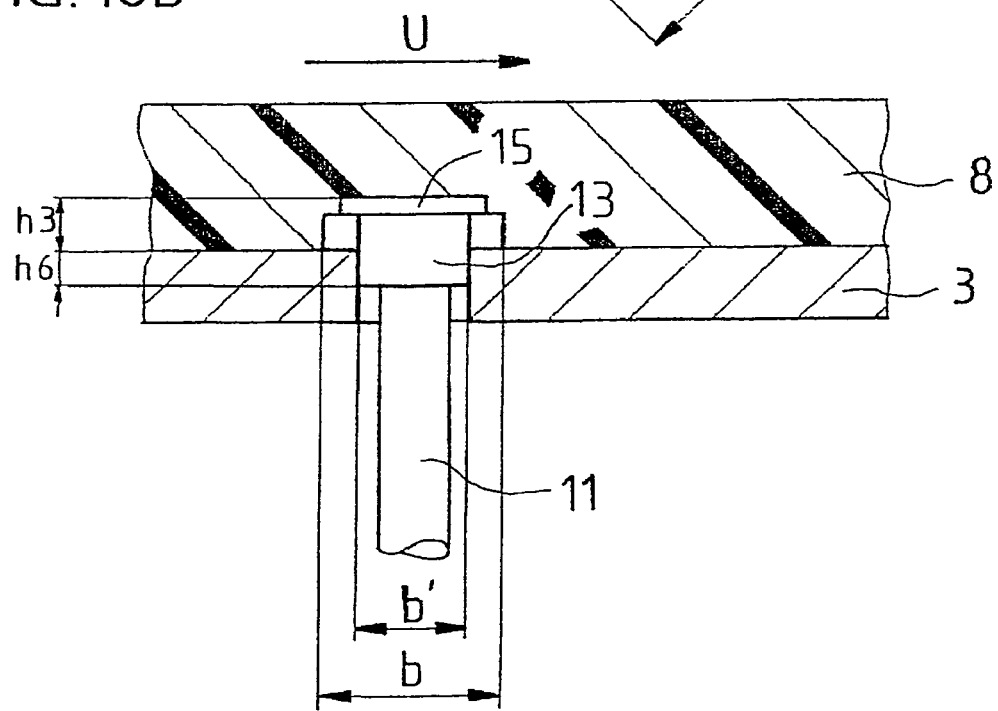

For mounting, as is shown in FIG. 18a, the valve tube 11 with the sealing plate 13, with its longer main extent a oriented parallel to the longer main extent a' of the slot-shaped through opening 10, is tilted laterally about the longer main extent a, with the result that the vertical projection of the sealing plate 13 onto the slot-shaped through opening 10 is also smaller in its transverse extent with respect to the longer main extent a than the smaller main extent b' of the slot-shaped through opening 10. After this, the sealing plate 13 is pushed in through the slot-shaped through opening 10 between the basic rim 3 and the sealing ring 8 and, after this, it is tilted back again counter to the original tilting direction, with the result that the sealing plate 13 with its edge regions which protrude on both sides beyond the shorter transverse extent rests on the rim parallel to the longer main extent a' of the slot-shaped through opening 10 and engages with its tongues 29 in a form-fitting manner into the slot-shaped through opening 10. For this purpose, b''' is dimensioned with respect to b in such a way that only a small clearance fit is effected between the mounted sealing plate 13 and the slot-shaped through opening 10. This is shown in FIG. 18b.

As a result, the plate 13 rests with its underside on the rim surface outside the slot-shaped through opening 10, and the sealing lip 15 is in sealing contact along its extent with the radial inner side of the sealing ring 8. The seal opening 9 of the sealing ring 8 opens on the radially inner side of the sealing ring 8 into the region which is surrounded by the sealing lip 15. On account of the high internal pressure of the vehicle tire, the sealing ring 8, the sealing plate 13 and the basic rim 3 are pressed radially against one another to such an extent that a reliable sealing connection is brought about between the sealing lip 15 and the sealing ring 8.

FIGS. 17 and 18 show, by way of example, a further embodiment, in which the slot-shaped through opening 10 is oriented with its longer main extent a' in the circumferential direction U of the vehicle wheel.

The invention claimed is:

1. A sealing ring for a vehicle wheel having a tubeless pneumatic tire with two tire beads formed on a radially inner side and by which the tubeless pneumatic tire is mounted on a radial outer side of a multiple part rim, comprising:
the sealing ring sealing the pneumatic tire radially inward toward the multiple part rim and arranged on the radial outer side of the rim, extending over a circumference of the rim in a circumferential direction and extending between the two tire beads of the pneumatic tire in the axial direction;
the sealing ring being configured with a central annular body comprising a cylindrical inner face for seating on a rim outer face and configured with a concentric flexible annular limb on both axial sides of the central annular body, each annular limb extending obliquely radially outward in an axial direction from the central annular body and containing therein no reinforcement; and
concentrically arranged projecting deformable sealing elements formed at an end of each annular limb which points away from the central annular body,
wherein, when the sealing ring is in an un-installed state, each of the deformable sealing elements are arranged on and project from a radially inwardly pointing surface arranged between the central annular body and the end of each annular limb, and
wherein, in the un-installed state, a free end of a first of the deformable sealing elements comprises a diameter that is less than a diameter of a free end of a second of the deformable sealing elements and the first deformable sealing element is arranged closer to the central annular body than the second deformable sealing element.

2. The sealing ring as claimed in claim 1, wherein the deformable sealing elements are configured radially outside the central annular body and project by a same amount from the radially inwardly pointing surface of the annular limb.

3. The sealing ring as claimed in claim 1, wherein the deformable sealing elements are sealing lips having rounded free ends.

4. The sealing ring as claimed in claim 1, wherein all of the sealing elements are a plurality of sealing lips distributed in a radial direction and oriented in the circumferential direction.

5. The sealing ring as claimed in claim 4, wherein the sealing lips extend away from the annular limb substantially perpendicularly with respect to a surface of the annular limb.

6. The sealing ring as claimed in claim 1, further comprising a reinforcing member structured to reinforce an annular body formed on the central annular body between the annular limbs.

7. The sealing ring as claimed in claim 6, wherein the reinforcement member is one or more radial elevations configured on the radial outer side of the annular body.

8. The sealing ring as claimed in claim 7, further comprising a hollow space formed at least in one radial elevation.

9. The sealing ring as claimed in claim 6, further comprising a reinforcing rib oriented in the circumferential direction.

10. The sealing ring as claimed in claim 1, wherein an axial spacing between axial outer sides of the annular limbs in a first radial position which corresponds to a radial position of radially inner ends of the annular limbs is smaller than an axial bead spacing ($t_1$) of the tire beads in a mounted operating state on the rim in the first radial position, an axial spacing between the axial outer sides of the annular limbs in a second radial position which corresponds to a radial position of the radially outer ends of the annular limbs is greater than an axial bead spacing ($t_2$) of the tire beads in the mounted operating state on the rim in the second radial position, and an axial spacing between the axial outer sides of the annular limbs in a region of the sealing elements is greater than an axial bead spacing ($t_1$) of the tire beads in the mounted operating state on the rim in the first radial position.

11. The sealing ring as claimed in claim 10, wherein the axial spacing between the axial outer sides of the annular limbs in a region at least of the radially outer sealing elements which are configured on the annular limbs is greater than a respective axial bead spacing of the tire beads in the mounted operating state on the rim in the radial position.

12. The sealing ring as claimed in claim 9, wherein the difference of the axial spacing between the axial outer sides of the two limbs minus the axial bead spacing of the tire beads in the mounted operating state in the respectively assigned radial position decreases in the radial direction from one sealing element to the next sealing element.

13. The sealing ring as claimed in claim 3, wherein the deformable sealing elements are sealing lips having a V-shaped cross section.

14. The sealing ring as claimed in claim 4, wherein the sealing elements are three to six sealing lips extending over the entire circumference of the sealing ring.

15. The sealing ring as claimed in claim 9, wherein the reinforcing rib extends over the entire circumference of the annular body and configured on the radial outer side of the central annular body between the annular limbs.

16. The sealing ring as claimed in claim 12, wherein the axial spacing between the axial outer sides of the annular limbs in the region of all the sealing elements which are configured on the annular limbs is greater than a respective axial bead spacing of the tire beads in the mounted operating state on the rim in the radial position.

17. A sealing ring for a vehicle wheel having a tubeless pneumatic tire with two tire beads formed on a radially inner side and by which the tubeless pneumatic tire is mounted on a radial outer side of a multiple part rim, comprising:
  the sealing ring sealing the pneumatic tire radially inward toward the rim and arranged on the radial outer side of the rim, extending over a circumference of the rim in a circumferential direction and extending between the two tire beads of the pneumatic tire in the axial direction;
  the sealing ring being configured with a central annular body comprising a cylindrical inner face for seating on a rim outer face and configured with a concentric flexible annular limb on both axial sides of the central annular body, each annular limb extending obliquely radially outward in an axial direction from the central annular body and containing therein no reinforcement; and
  deformable sealing elements formed at an end of the annular limb which points away from the central annular body,
  wherein, when the sealing ring is in an un-installed state, the deformable sealing elements are arranged on and project from a radially inwardly pointing surface of each annular limb so as to extend over a circumference of the annular limb, and
  wherein the deformable sealing elements are separated by grooves whose bottoms define different diameters and comprise sealing lips having rounded free ends which define different diameters.

18. A sealing ring for a vehicle wheel having a tubeless pneumatic tire with two tire beads formed on its radially inner side and by which the tubeless pneumatic tire is mounted on a radial outer side of a multiple part rim, the sealing ring, in an un-installed state, comprising:
  a central annular body comprising a cylindrical inner face for seating on a rim outer face;
  a first flexible member arranged on a first side of the central annular body, the first flexible member containing therein no reinforcement and having an inner surface which extends to the cylindrical inner face and which faces the rim outer surface when the sealing ring is installed on the vehicle wheel;
  first deformable sealing elements formed on the first flexible member and projecting from the inner surface toward the rim outer surface when the sealing ring is installed on the vehicle wheel;
  a second flexible member arranged on a second side of the central annular body, the second flexible member containing therein no reinforcement and having an inner surface which extends to the cylindrical inner face and which faces the rim outer surface when the sealing ring is installed on the vehicle wheel;
  second deformable sealing elements formed on the second flexible member and projecting from the inner surface toward the rim outer surface when the sealing ring is installed on the vehicle wheel,
  wherein free ends of the first deformable sealing elements define different diameters on the first side and free ends of the second deformable sealing elements define different diameters on the second side.

19. The sealing ring as claimed in claim 18, wherein the first and second deformable sealing elements are separated by grooves whose bottoms define different diameters on each of the first and second sides.

20. The sealing ring as claimed in claim 19, wherein the free ends of the first and second deformable sealing elements are rounded.

21. The sealing ring as claimed in claim 20, wherein the bottoms of the grooves are rounded.

22. The sealing ring as claimed in claim 18, wherein the free ends of the first and second deformable sealing elements are rounded.

23. The sealing ring as claimed in claim 18, wherein a circumferential thickness of the first flexible member is greater at a free end area thereof than at a portion of the first flexible member arranged adjacent the central annular body and wherein a circumferential thickness of the second flexible member is greater at a free end area thereof than at a portion of the second flexible member arranged adjacent the central annular body.

24. The sealing ring as claimed in claim 18, wherein a circumferential thickness of the first flexible member is greater in a portion of the first flexible member having the first deformable sealing elements than at a portion of the first flexible member arranged adjacent the central annular body and wherein a circumferential thickness of the second flexible member is greater in a portion of the second flexible member having the second deformable sealing elements than at a portion of the second flexible member arranged adjacent the central annular body.

25. A sealing ring for a vehicle wheel having a tubeless pneumatic tire with two tire beads formed on its radially inner side and by which the tubeless pneumatic tire is mounted on a radial outer side of a multiple part rim, the sealing ring, in an un-installed state, comprising:
  a central annular body comprising a cylindrical inner face for seating on a rim outer face;
  a first flexible member arranged on a first side of the central annular body, the first flexible member containing therein no reinforcement and having an inner surface which extends to the cylindrical inner face and which faces the rim outer surface when the sealing ring is installed on the vehicle wheel;
  first deformable sealing elements formed on the first flexible member and projecting from the inner surface toward the rim outer surface when the sealing ring is installed on the vehicle wheel;
  a second flexible member arranged on a second side of the central annular body, the second flexible member containing therein no reinforcement and having an inner surface which extends to the cylindrical inner face and which faces the rim outer surface when the sealing ring is installed on the vehicle wheel;
  second deformable sealing elements formed on the second flexible member and projecting from the inner surface toward the rim outer surface when the sealing ring is installed on the vehicle wheel,
  wherein a circumferential thickness of the first flexible member is greater in a portion of the first flexible member having the first deformable sealing elements than at a portion of the first flexible member arranged adjacent the central annular body,
  wherein a circumferential thickness of the second flexible member is greater in a portion of the second flexible member having the second deformable sealing elements than at a portion of the second flexible member arranged adjacent the central annular body,
  wherein free ends of the first deformable sealing elements define different diameters on the first side and free ends of the second deformable sealing elements define different diameters on the second side, and wherein the first and second deformable sealing elements are separated by grooves whose bottoms define different diameters on each of the first and second sides.

26. A sealing ring for a vehicle wheel having a tubeless pneumatic tire with two tire beads formed on a radially inner side and by which the tubeless pneumatic tire is mounted on a radial outer side of a multiple part rim, comprising:

the sealing ring sealing the pneumatic tire radially inward toward the rim and arranged on the radial outer side of the rim, extending over a circumference of the rim in a circumferential direction and extending between the two tire beads of the pneumatic tire in the axial direction;

the sealing ring being configured with a central annular body comprising a cylindrical inner face for seating on a rim outer face and configured with a concentric flexible annular limb on both axial sides of the central annular body, each annular limb extending obliquely radially outward in an axial direction from the central annular body and containing therein no reinforcement; and deformable sealing elements formed at an end of the annular limb which points away from the central annular body, wherein, when the sealing ring is in an un-installed state, the deformable sealing elements are arranged on and project from a radially inwardly pointing surface of each annular limb so as to extend over a circumference of the annular limb, and wherein each said end area is thicker in cross-section than an area connecting each said end area to the central annular body.

27. The sealing ring as claimed in claim 26, wherein each deformable sealing element extends out perpendicularly from each flexible annular limb.

28. The sealing ring as claimed in claim 18, wherein an end area of each of the first and second flexible members is thicker in cross-section than an area connecting the first and second flexible members to the central annular body, and wherein each deformable sealing element extends out perpendicularly from each of the first and second flexible members.

* * * * *